J. F. G. ROBERTS.
PORTABLE OR FIELD COOKING APPARATUS.
APPLICATION FILED MAR. 26, 1913.
1,141,490.
Patented June 1, 1915.
2 SHEETS—SHEET 1.
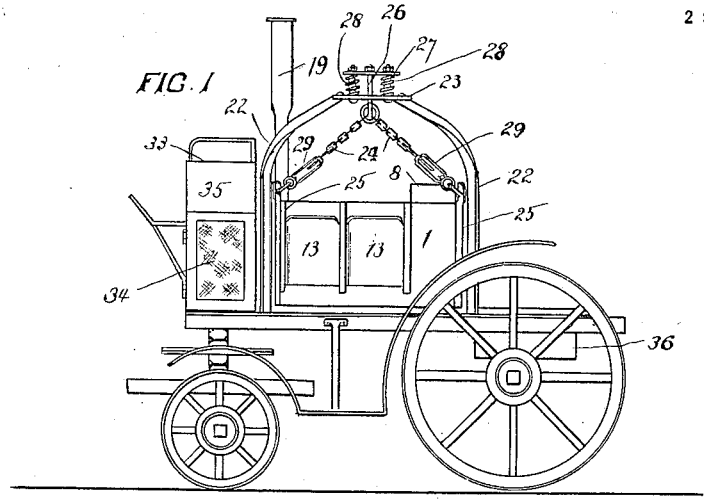
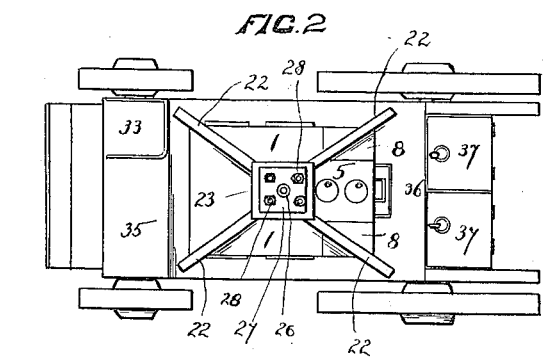
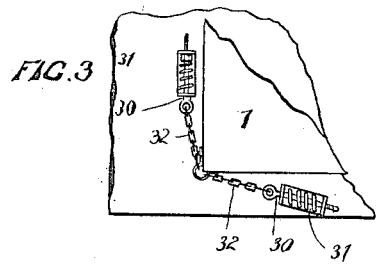
Witnesses
W. H. Rode
Anna Hayer.
Inventor
James Ferdinand Groom Roberts
by Alf Hunter
Atty

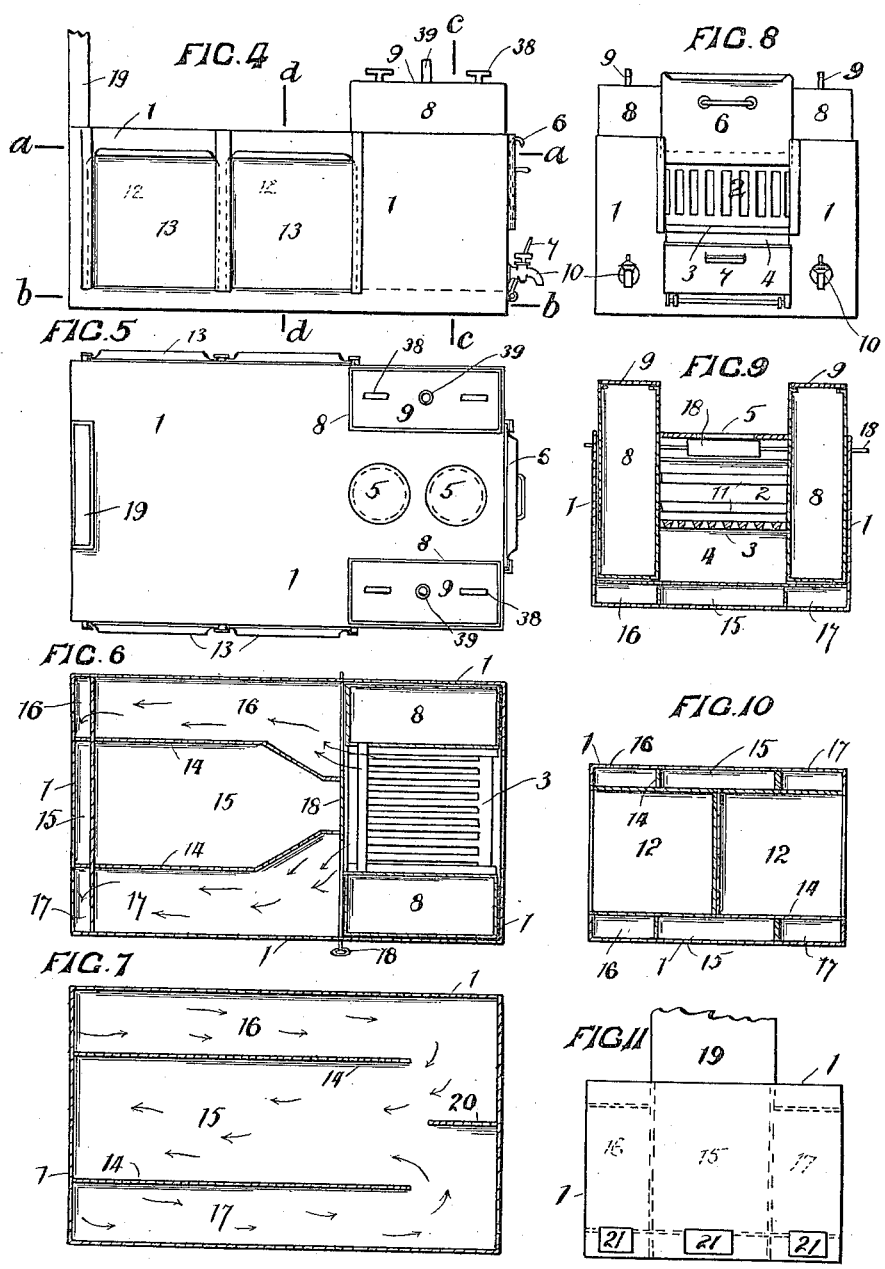

UNITED STATES PATENT OFFICE.

JAMES FERDINAND GROOM ROBERTS, OF WELLINGTON, NEW ZEALAND.

PORTABLE OR FIELD COOKING APPARATUS.

1,141,490.

Specification of Letters Patent.

Patented June 1, 1915.

Application filed March 26, 1913. Serial No. 756,851.

*To all whom it may concern:*

Be it known that I, JAMES FERDINAND GROOM ROBERTS, subject of the King of Great Britain, residing at Wellington, in the Dominion of New Zealand, have invented new and useful Improvements in Portable or Field Cooking Apparatus; and I do hereby declare the following to be a full, clear, and exact description of the same.

This invention has been devised in order to provide compact portable cooking apparatus for use by expeditionary forces, military forces when in camp or on the march, railway construction gangs or any other body or force that in operation moves about from place to place.

The apparatus is so designed as to be self contained upon a single transport wagon which wagon also contains provision for the storage of supplies of water, fuel and foods so that the cooking operations may be proceeded with during the travel of the apparatus.

The invention therefore is specially useful for military purposes as permitting the cooking outfit to accompany soldiers on the march and for the food being ready for consumption immediately a halt is made.

The invention consists in a special form of oven having any desired number of cooking chambers and having water boilers and a fire box and flues so arranged as to submit the cooking chambers to a maximum amount of heat. Combined with this oven is a special construction of transport wagon adapted to carry the oven and provided with means for supporting it thereon in such a manner that the oven will be kept automatically level during the travel of the wagon, and also provided with water tanks for the storage of a water supply, safes for holding the foods to be cooked and bunker chambers to hold the fuel for heating the oven.

In fully describing the invention, reference will be made to the accompanying sheets of drawings, in which:—

Figure 1 is a side elevation of the whole apparatus. Fig. 2 is a plan thereof. Fig. 3 is a detail view illustrating the manner of attaching the corners of the oven to the wagon. Fig. 4 is a side elevation of the oven. Fig. 5 is a plan thereof. Fig. 6 a sectional plan taken on the line *a—a* of Fig. 4. Fig. 7 a similar section taken on the line *b—b* of Fig. 4. Fig. 8 is an elevation of the fire box end of the oven. Fig. 9 is a cross sectional elevation taken on the line *c—c* of Fig. 4. Fig. 10 is a cross section taken on the line *d—d* of Fig. 4. Fig. 11 is an elevation of the back end of the oven.

The oven shown in Figs. 4 to 11 may be made of any desired size and with any desired number of cooking or baking chambers, according to the number of men to be cooked for.

The oven is formed of a casing (1) having a fire box 2 arranged in the center of its front end which fire box is provided with a grating or bars 3 arranged above an ash pit 4. The fire box extends backward into the oven for any desired distance and the top of the oven is provided, above the fire box, with the usual cooking openings and lids 5. The fire space is also provided with a sliding door cover 6 shown partially raised in Fig. 8, while the ash pit is provided with a hinged door 7 for closing its front.

Along each side of the fire box are situated water boilers 8. These boilers are made of suitable material and let into the casing 1 so that their tops extend out through the top of the casing and preferably project up beyond the oven top as shown in Figs. 4 and 5. Each boiler is provided with a cover or lid 9 suitably packed to make a steam tight joint therewith and having handles 38 and a steam escape pipe 39. Each boiler is also provided with a draw off tap 10 opening through the casing front. If desired, the two boilers may be connected together by water tubes 11 (Fig. 9) extending across the fire box to insure of the quicker heating of the water placed therein. Other known circulating or water jacket apparatus may be provided if preferred.

The cooking chambers 12 are arranged at the back of the fire box. These chambers are arranged back to back and open outward through the sides of the casing. Any desired number may be provided. In the drawings four are shown, two on each side. Each chamber is furnished with a sliding door 13 for closing it and also with the usual shelves or trays for supporting the food placed therein. The several doors covering the cooking chambers and the fire box are made to slide up and down in preference to being hinged, in order to economize space and to prevent any liability of the doors swinging open and shut while the oven is being transported.

The arrangement of the flues for heating the oven top and the cooking chambers is shown clearly in the Figs. 6, 7, 10 and 11. A space is left between the top of the cooking chambers and the casing which space opens into the fire box at its front end, and at its back end connects with a similar space extending down between the casing end and the sides of the cooking chambers, and this space, in turn, connects with a third space extending beneath the bottom of the casing and the cooking chambers as well as the boilers and ash pit. These several spaces are divided longitudinally throughout their lengths by partitions 14 so as to form a central flue 15 and side flues 16 and 17 which extend continuously with one another along the top, down the back and then along the bottom of the casing. The passage into the central flue 15 from the fire box is blocked by means of a pivoted damper 18 (Figs. 6 and 9) which when closed diverts the heat from the fire along the side flues 16 and 17. This damper is kept closed when the full heating of the oven is required, but it may be opened more or less to allow of the heat passing along the central flue 15 when desired, or for a quick draft to aid the fire. The back portion of the central flue 15 opens through the top of the casing into a smoke stack 19 made of any suitable height to provide the necessary draft through the flues.

The partitions 14 at the bottom of the casing are carried to within a short distance only from the front end of the casing, as shown in Fig. 7 so as thereby to provide for communication between the two outer flues and the central flue.

The course of the heat from the fire will thus be along the flues 16 and 17 over the top of the cooking chambers, down the back end thereof, along the bottom beneath the cooking chambers and the water boilers, and then into the central flue 15, back along it, and up to the smoke stack. A baffle plate 20 (Fig. 7) may be arranged to extend forwardly between the partitions 14 and thereby insure of the heat and smoke from the outer flues passing into the central flue.

Soot doors 21 are situated in the back end of the oven, one for each flue in order to permit of the flues being cleaned and the soot removed.

It will be seen that the heat from the fire will act all around the cooking chambers and as it passes along the tops thereof will heat the top of the casing so that the contents of the cooking vessels placed thereon may be boiled and kept boiling.

An oven thus constructed is adapted to be carried on the transport wagon shown in Figs. 1 and 2. This wagon is provided with the four supporting pillars 22 extending upward from it and bent over to above the center and then fixed to a plate 23. The oven is adapted to lie beneath the support thus formed and it is carried thereon by means of chains 24 attached to angle pieces 25 fitting on to the four corners of the oven and connected to a shackle bolt 26. This shackle bolt passes up through the plate 23 and through another plate 27 situated above it. Springs 28 are placed between the two plates so that these springs serve to support the shackle bolt and the oven suspended thereon. They therefore serve also to absorb any shock or jar and prevent its transmission to the oven during transportation. Each chain is made capable of adjustment in length by the interposition of a screw shackle 29 therein, in order that the oven may be adjusted to swing clear of the wagon floor. When desired the oven may be lowered to rest firmly on the floor by the use of a longer bolt 26.

Each corner of the oven is fastened to the wagon floor in the manner shown in Fig. 3. This consists of spring cushioned shackle bolts 30 mounted in guide brackets 31 fixed to the wagon and connected to the oven by the chains 32. These bolts are so disposed as to present a spring check against the oven swinging in either direction from that corner and thus in conjunction with the fastenings of the other corners, to fasten the oven to the wagon in such a manner as to prevent any excessive swinging upon its support and to absorb the transporting jars. The oven will thus swing and retain a level position during its transport so that cooking operations may be proceeded with as effectually as if the wagon were stationary.

The driver's seat 33 is elevated and, beneath it, is built a chest 34 of any desired capacity. Above the chest is a water tank 35 in which a reserve supply for the oven boilers may be carried. At the rear of the wagon are coal bunkers 36 having doors 37 opening upward so that the oven fire may be fed as required. The oven may be removed from the wagon if so desired and caused to rest on the ground when a long stop is being made at any point. The wagon may then be used as a transport wagon for any other purpose.

What I do claim as my invention, and desire to secure by Letters Patent is:—

1. Portable cooking apparatus comprising an oven and a transport wagon having pillars projecting upward therefrom and connected together at their top ends, a plate overlying the pillar ends, cushion springs arranged between the plate and the pillars, a shackle bolt passing down through them and suspended from the plate, suspension chains connecting the shackle bolt with the oven and spring cushioned connections between the oven corners and the wagon floor, substantially as specified.

2. Portable cooking apparatus consisting of an oven formed by a casing having a fire place in its forward end water boilers arranged in the casing and extending upward on each side of the fire place and through the top of the casing, cooking chambers arranged to extend inward from each side of the casing at the rear of the fire place and positioned to leave spaces between them and the casing top, back end and bottom, and flues constructed between the cooking chambers and the casing to convey the heat from the fire place along within the top and down within the back and along within the bottom of the casing, to the forward end thereof, and then rearward to an escape flue situated at the back end of the casing, in combination with a wagon having means for suspending the oven thereon substantially as specified.

In testimony whereof, I have signed this specification in the presence of two subscribing witnesses.

JAMES FERDINAND GROOM ROBERTS.

Witnesses:
WALTER ALEXANDER,
M. E. BROWN.

Copies of this patent may be obtained for five cents each, by addressing the "Commissioner of Patents Washington, D. C."